UNITED STATES PATENT OFFICE.

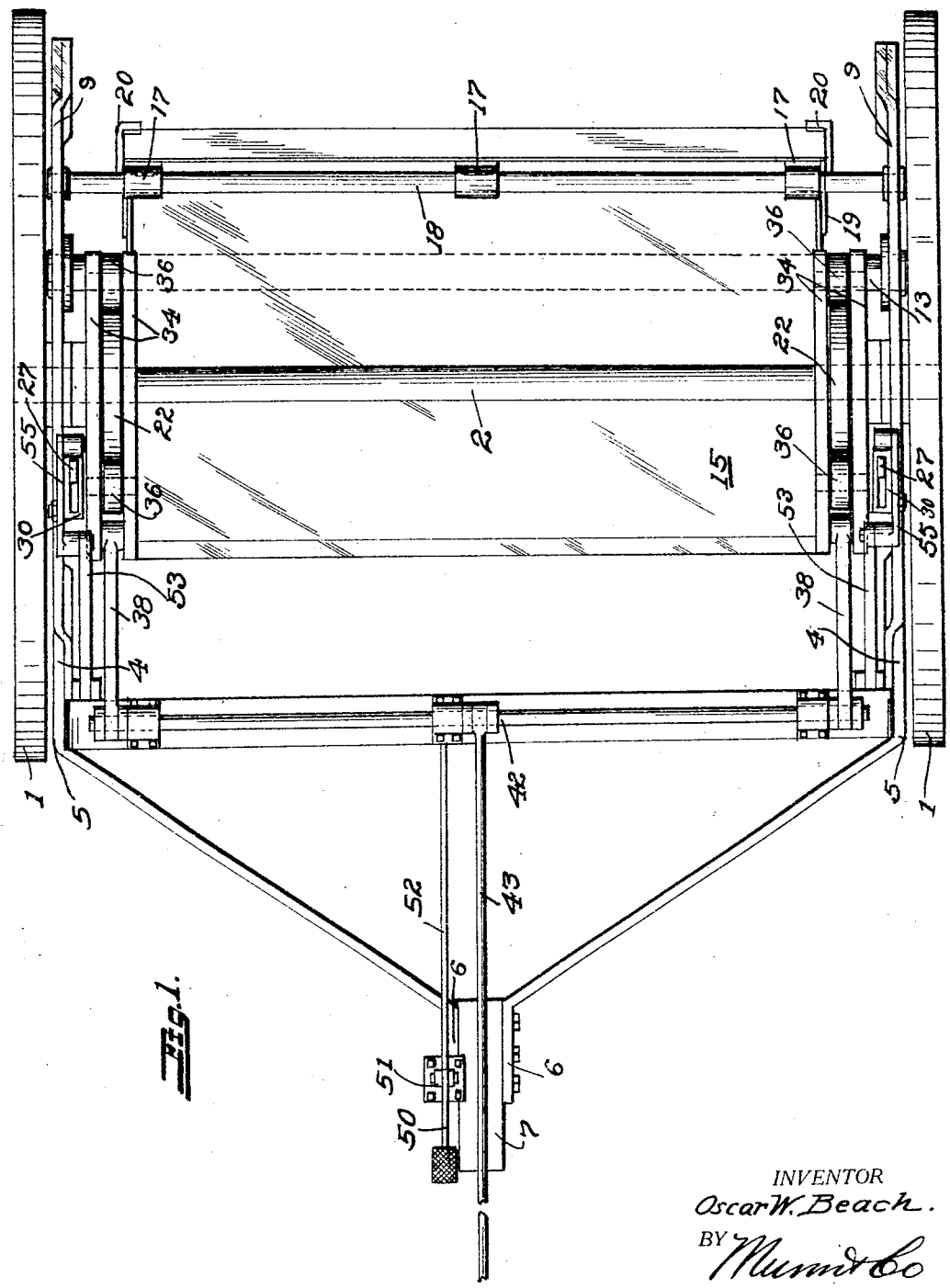

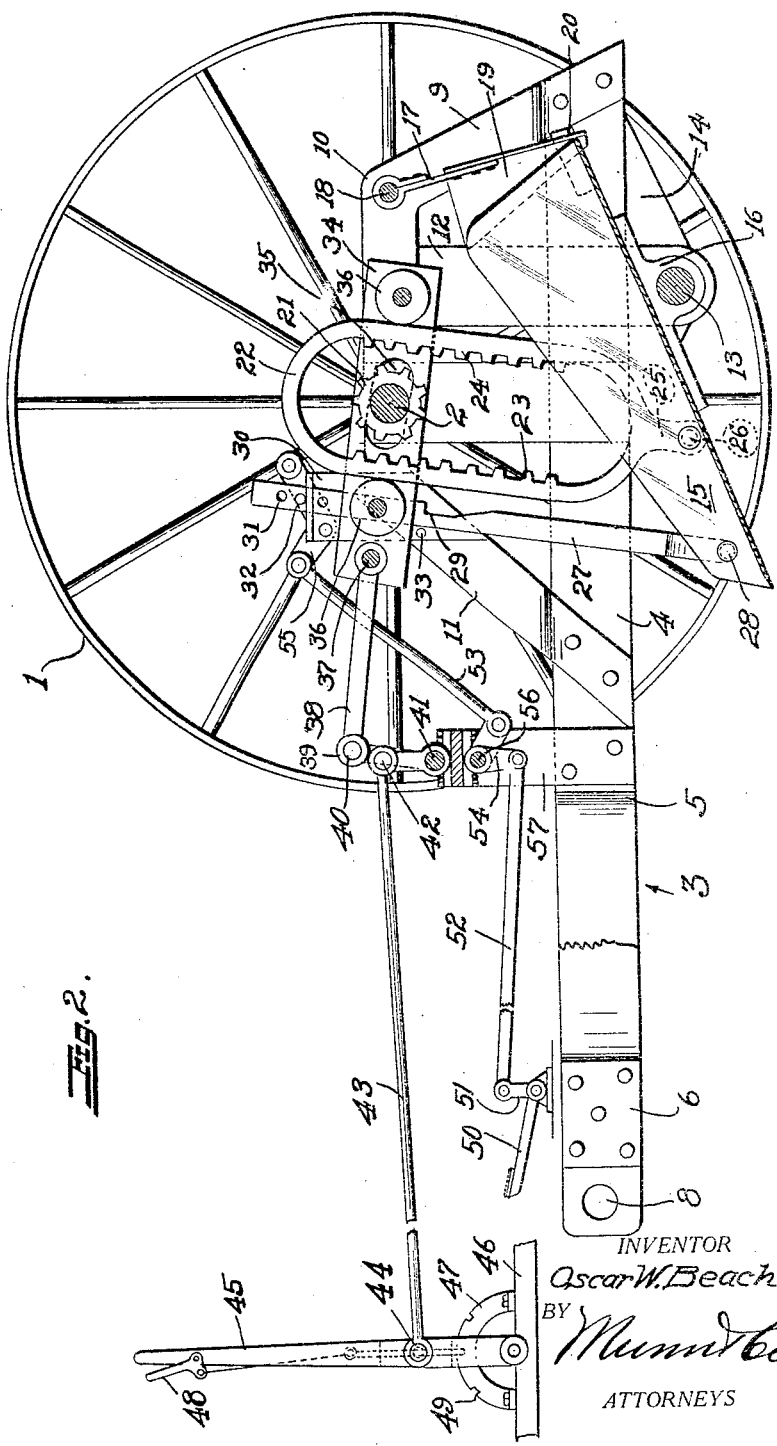

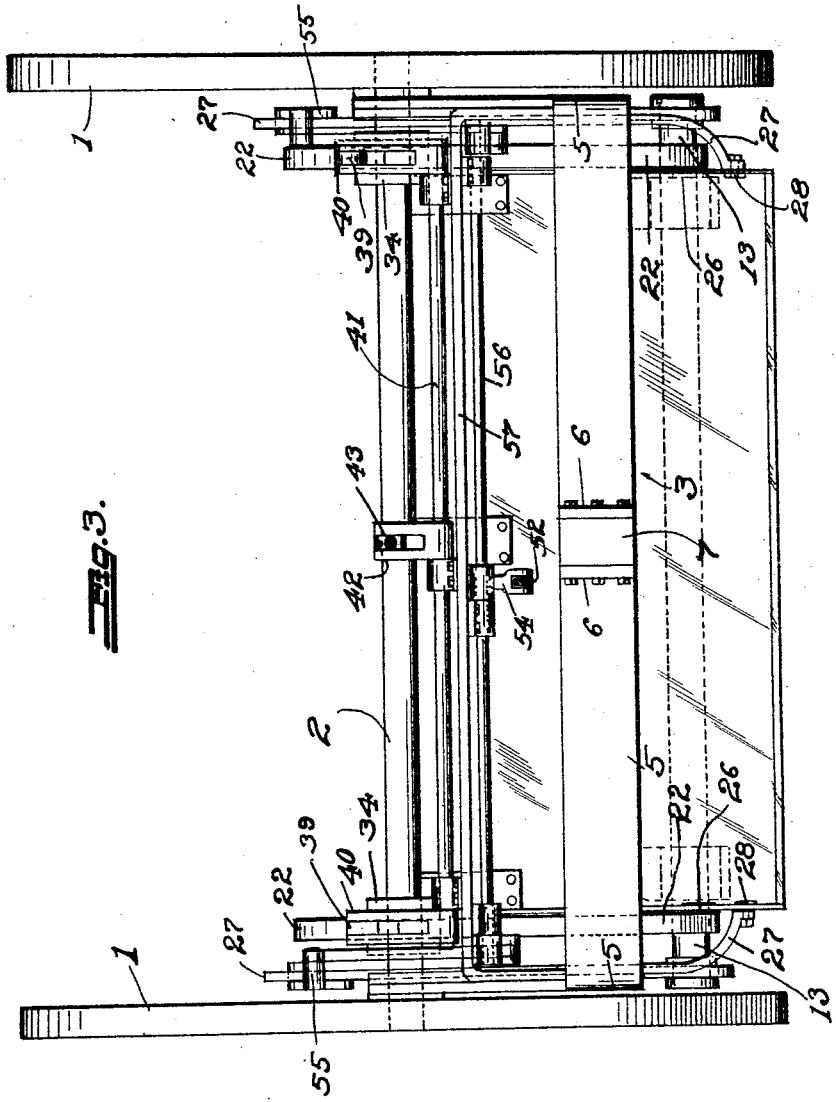

OSCAR W. BEACH, OF TURLOCK, CALIFORNIA.

LAND LEVELER.

1,403,934.  Specification of Letters Patent.  Patented Jan. 17, 1922.

Application filed March 27, 1920. Serial No. 369,298.

*To all whom it may concern:*

Be it known that I, OSCAR W. BEACH, a citizen of the United States, and a resident of Turlock, in the county of Stanislaus and State of California, have invented new and useful Improvements in Land Levelers, of which the following is a specification.

My invention relates to a land leveler and has reference more particularly to an improved machine which is adapted to be towed by a tractor or the like for leveling ground surfaces of agricultural lands, roadways and other like surfaces.

The primary object of the invention is to provide a machine which will operate with the greatest efficiency to which end one of the improved features of the machine resides in providing a scoop which is capable of assuming various scooping positions relative to the ground surface to be leveled and which is driven or operated preferably by a driving means actuated by the traction of the wheeled carriage on which it is mounted.

In one sense of the word, the machine contemplated by the invention is operated automatically in so far as concerns the scoop. For instance, when the scoop is regulated or thrown into scooping relation with the ground surface to be leveled by throwing the so-called driving means into operation the same will gradually elevate the scoop until the load carried thereby will be dumped or discharged from the back of the scoop, and as means have been provided whereby this discharge or dumping of the load may be accomplished gradually the load will be spread over the surface of the ground on which the machine is towed.

In connection with the operation of the scoop, I have also provided means whereby the scoop may be arrested or held in various operating positions. For instance, instead of effecting a continuous loading and unloading operation of the scoop, it will be possible to carry the load in the scoop without effecting an unloading of the same, or it will be possible to tow the machine with the scoop maintained in an inactive position. In other words, should it be desirable to fill the scoop and carry the load a considerable distance without discharging, the same may be readily accomplished, or in case the machine is to be towed without operating the scoop this likewise may be readily accomplished.

Again referring to the unloading feature of the scoop, I wish to call particular attention to the arrangement with which this particular operation is so conveniently realized. Broadly speaking, the discharge or unloading is really automatically brought about in that I provide a so-called gate for the discharge end of the scoop, which gate is so constructed that it will close the discharge end of the scoop so long as the scoop is in scooping relation relative to the ground surface or when the same has been elevated to a position whereby the load may be carried to the desired location for unloading. In reality this gate is adapted to automatically control the discharge area of the back of the scoop.

While I have so far been referring to the machine as being practically automatically operated it should of course be appreciated that the driver of the tractor behind which the machine is towed may, through a series of levers, or the like arrangement, control the functioning of the scoop to effect the results sought to be accomplished in properly leveling the ground.

In order to disclose the preferred manner of reducing the invention to practice, further reference to the idea will be made from the illustrative embodiment shown on the accompanying drawings.

In said drawing,

Figure 1 is a plan view of the machine;

Figure 2 is a longitudinal section and

Figure 3 is a front elevation.

As will be seen from all the figures, I propose to provide a wheeled carriage or wheeled frame in which the ground wheels 1 are supported and spaced apart on an axle 2 with the frame 3 suspended or hung from the axle 2. This frame 3 may be made in any convenient manner to meet requirements, such for instance, as a pair of horizontal members 4 which extend longitudinally of the machine with their front part bent, as at 5 and presented inwardly at an angle so that their extreme ends 6 may be again bent parallel to each other so that a block or the like 7 may be bolted or otherwise fixed therebetween, which block will serve as a draft connection, (see for instance the opening 8) for attachment to the tractor or other towing means.

At the rear end of each of the horizontal members 4 is fixed the upwardly slanting frame member 9 which is bent as at 10 and extends horizontally of the machine past the axle 2 where it is again bent downwardly to form the slanting member 11, the end of which terminating in fixed relation with the horizontal member 4 at a point intermediate the ends thereof. These upwardly presented members, just described, are underslung from the axle 2 and suspended therefrom, as a support for the vertical frame members 12 which directly support, by their respective ends, the shaft 13.

To add rigidity to the support of the shaft 13, members 14 are arranged to co-operate with the members 12 in supporting the shaft upon the frame. These members 14 being fixed to the rear ends of the horizontal members 4 and having a supporting bearing for the shaft 13. It is to be noted that the shaft 13 is supported, or rather suspended, upon the frame of the machine in a plane below the axle 2 and in the rear thereof.

15 represents the scoop which is pivotally mounted upon the shaft 13 and is of a width substantially that of the machine. The scoop is constructed on its bottom with a pair of sleeve bearings 16 which will enable the scoop to be conveniently mounted on the shaft 13 so that the same has substantially a pivotal mounting or in other words a freedom of oscillation on the shaft. The manner of mounting the scoop on the shaft is of especial importance as it is necessary to realize a proper balancing effect of the scoop in accomplishing an even operation of the same. The scoop will be constructed with an open front and an open back or rear end. Swingingly mounted on the upwardly presented frame members by straps 17 which are hung from the shaft 18 is a gate 19 which is adapted to co-operate with the scoop to close the rear end thereof so long as the scoop is in certain positions, for instance, when the scoop is scooping relative to the ground surface to be leveled and when the same has been elevated to a load carrying position. In order to hold the gate closed, the rear of the scoop is preferably provided with a pair of ears such as 20 which are located on the lower corner of the scoop and between which and the edge of the scoop the end of the gate is adapted to be confined so long as the scoop is inclined downwardly in scooping position and even when it has been elevated to substantially a horizontal position. However, just as soon as the scoop has been elevated past a certain horizontal position, the ears 20 will of course disengage the gate and permit the same to swing rearwardly of the machine, opening the unloading end of the scoop. The further the gate swings, the larger will be the discharge area of the rear end of the scoop, thus the gate in one respect controls the effective discharge area of the scoop. However, the association of the gate relative to the scoop is such that when the scoop has been elevated to a discharge position an unloading effect will be produced without the gate swinging as in this position the rear lowered end of the scoop will be below the lower end of the gate. Of course, the weight of the load on the gate when the scoop is in this position will be sufficient to swing the gate rearwardly.

In order to realize a convenient and practical functioning of the scoop, I propose to co-axially mount a pair of pinions 21 on opposite ends of the axle 2 and to provide yokes 22 with internal racks 23 and 24 along the vertical sides thereof and with the lower ends of the yokes 22 terminating in extensions 25 which are pivotally connected as at 26 to the respective sides of the scoop 15. As stated these pinions 21 are permanently fixed on the axle 2 and made to rotate therewith and in order to throw either one of the internal racks 23 or 24 in driving relation with the pinions, I provide a controlling means for the yokes 22 whereby the same may be thrown either forwardly or rearwardly to engage the teeth of the internal racks in driving relation relative to the pinions. It is, of course, understood that one of the wheels 1 is fixed to the axle so that the axle may cause the pinions 21 to rotate. From this construction it will be seen when the machine is being towed, the pinions 21 will be rotated anticlockwise. Therefore, should the yokes 22 be drawn forward, the racks 24 will be caused to mesh with the pinions 21 thus effecting an upward movement of the yokes and through them, an elevation of the scoop 15. When the scoop has been elevated to a desired degree, for instance, until the load carried thereby has been discharged through the open end, the yokes 22 will be thrown rearwardly, thus engaging the racks 23 with the pinions 21, consequently the scoop will be lowered.

By throwing the yokes 22 to an intermediate or neutral position so that neither racks 23 nor 24 can engage the pinions 21, the scoop may be maintained in a load-carrying position, or an inclined scooping position as occasion demands. To maintain the scoop, however, in a load-carrying position regardless of the fact that the balancing of the load in the scoop, by means of the position of shaft 13, and its associate parts, is a perfect balance, some means must be provided for holding the end of the scoop up. I therefore connect vertical rods 27 to opposite sides of the scoop as at 28 with a notched portion 29 in each rod made to engage the edge of a slot provided in vertically presented sleeves or the like 30 through which the rods 27 pass. A series of openings such as 31 are provided in each of the rods 27 which openings are made to receive pins 32 which act as stops to limit the downward inclination of the scoop. Guide pins 33 are arranged to guide the rods 27 upwardly through the sleeves 30 so as to properly effect engagement of the notches 29 with the edge of the slots in the sleeves.

As a convenient medium for effecting a manipulation of the yokes 22 I propose to provide strips 34 which are arranged in pairs so that each one of the yokes 22 will be confined between two parallel strips. These strips are slotted as at 35 in order that they may have a freedom of movement radially on the axle 2 and in order to reduce friction on the sides of the yokes as well as to confine the yokes firmly between each two of the strips 34, rollers 36 are provided. Connected to each two of the strips 34 at the front end thereof and by pivotal connections 37 are short levers 38 the opposite ends of which having pivotal connections as at 39 to a rod 40 which in turn is connected to a second rod 41 with the last named rod connected through the pivotal connections 42 to a long rod 43 which is pivotally connected as at 44 to a hand lever 45. This hand lever is mounted on a support 46 on or adjacent the tractor or other towing medium so that the same may be swung on the segment 47 when properly released by the lever 48. It is to be noted that the segment is provided with three notches 49 the forward one of which is made to receive the catch on the lever 45 when the lever is thrown forward so that the racks 24 may be moved in mesh with the pinions 21 when the yokes 22 are moved forward by a throw of the lever in the same direction. When the racks 23 and 24 are both to be moved out of mesh or in neutral position, the lever will be supported midway of the ends of the segment 47 with the catch 48 engaged in the intermediate one of the notches 49.

With this construction, it will be readily seen how the yokes 22 are manipulated to effect an elevation or lowering of the scoop 15.

As heretofore stated to maintain the scoop in load-carrying position, the notches 29 of the rods 27 will be engaged in the slots of the members 30. To realize this disengagement a foot lever 50 is mounted near the operator and adjacent the lever 45. This foot lever through the pivoted link 51 and the pivoted rod 52 which in turn is connected to the rod 53 through the toggle joint 54 may be employed to exert a pull on the end of the rods 27 by the bell cranks 55 which have a wiping contact with the ends of the rods when the foot lever 50 is pressed downwardly. It is, of course, understood that each of the rods 27 is provided with a bell crank 55 as in the case of the means for manipulating the yokes 22. This is accomplished by means of duplication of the rods 23 on each side of the machine both of which being operated from a shaft 56 which is common to both. The shaft 41 and the shaft 56 are of course properly supported from the frame of the machine by an upright such as 57.

I claim:

1. A machine of the class described, including a scoop having a mounting permitting the scoop to assume a scooping position relative to the ground surface, a load-carrying position and a load discharging position, and means for moving the scoop to said positions, said scoop having a gate closure for the back thereof, said gate closure being mounted independent of the scoop but adapted to co-operate therewith to close the back when the scoop is in both a scooping position and a load carrying position, said gate being automatically actuated to open the back of the scoop when the scoop is elevated to load discharging position.

2. A machine of the class described having a frame with ground wheels, a scoop mounted on the frame capable of assuming a scooping position relative to the ground surface, a load carrying position, and a load discharging position, means driven by the traction of the ground wheels for moving the scoop to said position, means for maintaining the scoop in any one of said positions with said driving means interrupted, and means for effecting a change of said position comprising a control for throwing the driving means into operation with the scoop; said scoop having an open back, a gate closure for said back mounted independent of the scoop and adapted to co-operate therewith to close the open back when the scoop is in scooping position and load carrying position, said gate closure being automatically opened relative to the back of the scoop when the scoop is in load discharging position.

3. In a machine of the class described, a frame having two ground wheels, a horizontal axle on said frame for the ground wheels and adapted to be rotated thereby, a scoop pivotally mounted upon the frame below said axle and in the rear thereof, said scoop adapted to assume a scooping position relative to the ground surface, a load carrying position, and a position to discharge the load through the back thereof, elevating means connected to opposite sides of the scoop in front of the said pivotal mounting, an operating drive between the axle for the ground wheels and the elevating means, and means for interrupting said drive.

4. A machine of the class described and as set forth in claims 1 and 3, and in which the means for moving the scoop to any one of said positions, comprises pinions on the axle of the ground wheel, said pinions adapted to rotate with said axle, oppositely disposed racks arranged adjacent said pinions and connected to the scoop, and means for selectively causing said racks to engage said pinions for elevating or lowering the scoop.

OSCAR W. BEACH.